(12) United States Patent
Xu et al.

(10) Patent No.: US 6,768,278 B2
(45) Date of Patent: Jul. 27, 2004

(54) GAS TURBINE ENGINE STARTER GENERATOR WITH SWITCHABLE EXCITER STATOR WINDINGS

(75) Inventors: Mingzhou Xu, Tucson, AZ (US); Wayne T. Pearson, Tucson, AZ (US); Cristian E. Anghel, Mississauga (CA); Jim Lengel, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 14 days.

(21) Appl. No.: 10/213,649

(22) Filed: Aug. 6, 2002

(65) Prior Publication Data

US 2004/0027077 A1 Feb. 12, 2004

(51) Int. Cl.[7] .............................. H02P 5/20; H02P 7/14; H02P 5/00; H02P 9/06
(52) U.S. Cl. ...................... 318/140; 318/151; 318/152; 318/153; 318/526; 322/10
(58) Field of Search .............................. 318/83, 89, 95, 318/140, 151–153, 252, 526, 107, 248; 322/10, 12–16, 39, 52

(56) References Cited

U.S. PATENT DOCUMENTS

| | | |
|---|---|---|
| 599,932 A | 3/1898 | Frankenfield et al. |
| 2,057,214 A | 10/1936 | Sleeter et al. |
| 3,233,158 A | 2/1966 | Gilbert |
| 3,263,144 A | 7/1966 | Neyhouse et al. |
| 3,412,304 A | 11/1968 | Baum et al. |
| 3,585,471 A | 6/1971 | Ecclesia |
| 3,753,069 A * | 8/1973 | Newton ........................ 318/440 |
| 3,761,753 A | 9/1973 | Fong et al. |
| 3,823,357 A * | 7/1974 | Sapper ........................ 318/719 |
| 3,842,327 A | 10/1974 | Wexler |
| 3,970,908 A | 7/1976 | Hansen et al. |
| 4,072,880 A | 2/1978 | Oshima et al. |
| 4,107,583 A | 8/1978 | Houtman |
| 4,246,531 A * | 1/1981 | Jordan ........................ 322/28 |
| 4,339,704 A * | 7/1982 | McSparran et al. ........... 322/90 |
| 4,352,051 A | 9/1982 | Johnson |
| 4,371,906 A | 2/1983 | Alessio et al. |
| 4,378,520 A | 3/1983 | Ford |
| 4,451,775 A | 5/1984 | Phillips et al. |
| 4,459,532 A | 7/1984 | Schutten et al. |
| 4,675,591 A | 6/1987 | Pleiss |
| 4,743,777 A * | 5/1988 | Shilling et al. ............... 290/46 |
| 4,862,053 A | 8/1989 | Jordan et al. |
| 4,947,100 A * | 8/1990 | Dhyanchand et al. ......... 322/10 |
| 4,992,721 A * | 2/1991 | Latos ........................ 322/10 |
| 5,103,153 A | 4/1992 | Droho |
| 5,418,436 A | 5/1995 | Apuzzo |
| 5,428,275 A | 6/1995 | Carr et al. |
| 5,430,362 A | 7/1995 | Carr et al. |
| 5,446,352 A * | 8/1995 | Yang ........................ 318/248 |
| 5,455,885 A | 10/1995 | Cameron |
| 5,493,201 A * | 2/1996 | Baker ........................ 322/10 |
| 5,537,020 A | 7/1996 | Couture et al. |
| 5,650,697 A | 7/1997 | Imagi et al. |
| 5,650,707 A | 7/1997 | Lipo et al. |
| 5,850,138 A * | 12/1998 | Adams et al. ................ 322/68 |
| 5,920,162 A * | 7/1999 | Hanson et al. .............. 318/254 |
| 6,025,693 A | 2/2000 | Smith |
| 6,040,679 A | 3/2000 | Monk et al. |
| 6,066,941 A | 5/2000 | French |
| 6,204,618 B1 | 3/2001 | Wang et al. |
| 6,320,348 B1 | 11/2001 | Kadah |
| 6,346,790 B1 | 2/2002 | Kemp et al. |
| 6,486,640 B2 * | 11/2002 | Adams ........................ 322/59 |
| 6,628,024 B1 * | 9/2003 | Mirmobin .................... 310/71 |

* cited by examiner

*Primary Examiner*—Bentsu Ro
*Assistant Examiner*—Patrick Miller
(74) *Attorney, Agent, or Firm*—Douglas A. Mullen, Esq.

(57) ABSTRACT

A rotating electrical machine, such as an aircraft starter-generator, includes an exciter that has its stator windings divided into a number of sections. A plurality of switches are electrically coupled to the exciter stator winding sections and are configured and controlled so that the exciter stator winding sections may be selectively coupled in series or in parallel with one another, and selectively coupled to receive either DC or AC power.

20 Claims, 3 Drawing Sheets

GAS TURBINE ENGINE STARTER GENERATOR WITH SWITCHABLE EXCITER STATOR WINDINGS

FIELD OF THE INVENTION

The present invention relates to rotating electrical machines such as high speed starter generators for gas turbine engines and, more particularly, to an exciter generator within a starter-generator having stator windings that are switchable between series and parallel configurations.

BACKGROUND OF THE INVENTION

An aircraft may include various types of rotating electrical machines such as, for example, generators, motors, and motor/generators. Motor/generators are used as starter-generators in some aircraft, since this type of rotating electrical machine may be operated as either a motor or a generator.

An aircraft starter-generator may include three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating as a generator. Conversely, if the starter-generator is operating as a motor, the control device supplies AC power.

If the starter-generator is operating as a generator, the DC current from the control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating as a motor, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

A starter-generator, such as the one described above, may be used to start the engines or auxiliary power unit (APU) of an aircraft when operating as a motor, and to supply electrical power to the aircraft power distribution system when operating as a generator. Thus, when operating as a motor, a starter-generator may be designed to supply mechanical output torque sufficient to start the engines. In addition, the starter-generator may be designed for optimal generator performance. For optimal generator performance, the exciter stator windings may be electrically connected in series with one another. However, with series coupled exciter stator windings, the exciter stator may need AC power with a relatively high voltage magnitude to generate sufficiently high rotational mechanical power when operating as a motor. This is because the exciter windings may exhibit a fairly low impedance to DC power, but a fairly high impedance to AC power. As a result, the AC power supply section of the starter-generator system may increase the size, weight, and cost of the overall starter-generator system.

Hence, there is a need for a starter-generator that, when operating as a motor, can generate torque that is sufficiently high to start an aircraft engine without adversely impacting the starter-generator's performance in the generating mode, and/or does not significantly impact the starter-generator size and/or weight and/or cost. The present invention addresses one or more of these needs.

SUMMARY OF THE INVENTION

The present invention relates to a gas turbine engine starter-generator that, when operating as a motor, can generate torque that is sufficiently high to start an aircraft engine and, when operating as a generator, can generate sufficient electrical power.

In one embodiment of the present invention, and by way of example only, a gas turbine engine starter-generator includes a housing, a shaft, a main rotor, a main stator, an exciter rotor, an exciter stator, and a control circuit. The shaft is rotationally mounted within the housing. The main rotor is mounted on the shaft, and the main stator is mounted within the housing and surrounds the main rotor. The exciter rotor is mounted on the shaft. The exciter stator is mounted within the housing and surrounds the exciter rotor, and has windings that are electrically divided into a predetermined number of sections. The control circuit is coupled to the exciter stator windings and is operable (i) to selectively supply one of AC and DC power thereto and (ii) to selectively couple the predetermined number of exciter stator winding sections in one of series and parallel with one another.

In another exemplary embodiment, a motor/generator includes a main rotor, a main stator, an exciter, and a control circuit. The main rotor is rotationally mounted. The main stator surrounds at least a portion of the main rotor. The exciter includes a rotor that is configured to rotate with the main rotor and a stator that has windings electrically divided into a predetermined number of sections. The control circuit is coupled to the exciter stator windings and is operable (i) to selectively supply AC and DC power thereto and (ii) to selectively couple the predetermined number of exciter stator winding sections in one of series and parallel with one another.

In yet another exemplary embodiment, in a gas turbine engine starter-generator including at least an exciter assembly having a stator with windings thereon, a method of modifying the starter-generator includes dividing the exciter stator windings into a predetermined number of sections, each having two electrical ends. A plurality of first controllable switches is electrically coupled between selected ones of the predetermined number of exciter stator winding section electrical ends such that when a first group of the first controllable switches is closed and a second group of the first controllable switches is open, the predetermined number of exciter stator winding sections are electrically coupled in series with one another, and when the first group of first controllable switches is open and the second group of the first controllable switches is closed, the predetermined number of exciter stator winding sections are electrically coupled in parallel with one another.

In yet still a further exemplary embodiment, in a gas turbine engine starter-generator including at least an exciter assembly having a stator with windings thereon that are divided into a predetermined number of sections, a method of operating the starter-generator in a generating mode and a motoring mode includes electrically coupling the predetermined number of exciter stator winding sections in series with one another and supplying DC power to the series-coupled exciter stator winding sections, to thereby operate the starter-generator in the generating mode, and electrically coupling the predetermined number of exciter stator winding sections in parallel with one another and supplying AC power to the parallel-coupled exciter stator windings, to thereby operate the starter-generator in the motoring mode.

Other independent features and advantages of the preferred starter generator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present invention is, for convenience of explanation, depicted and described as being implemented in a brushless AC (alternating current) motor/generator, it will be appreciated that it can be implemented in other AC motor/generator designs needed in specific applications.

Figure 1:
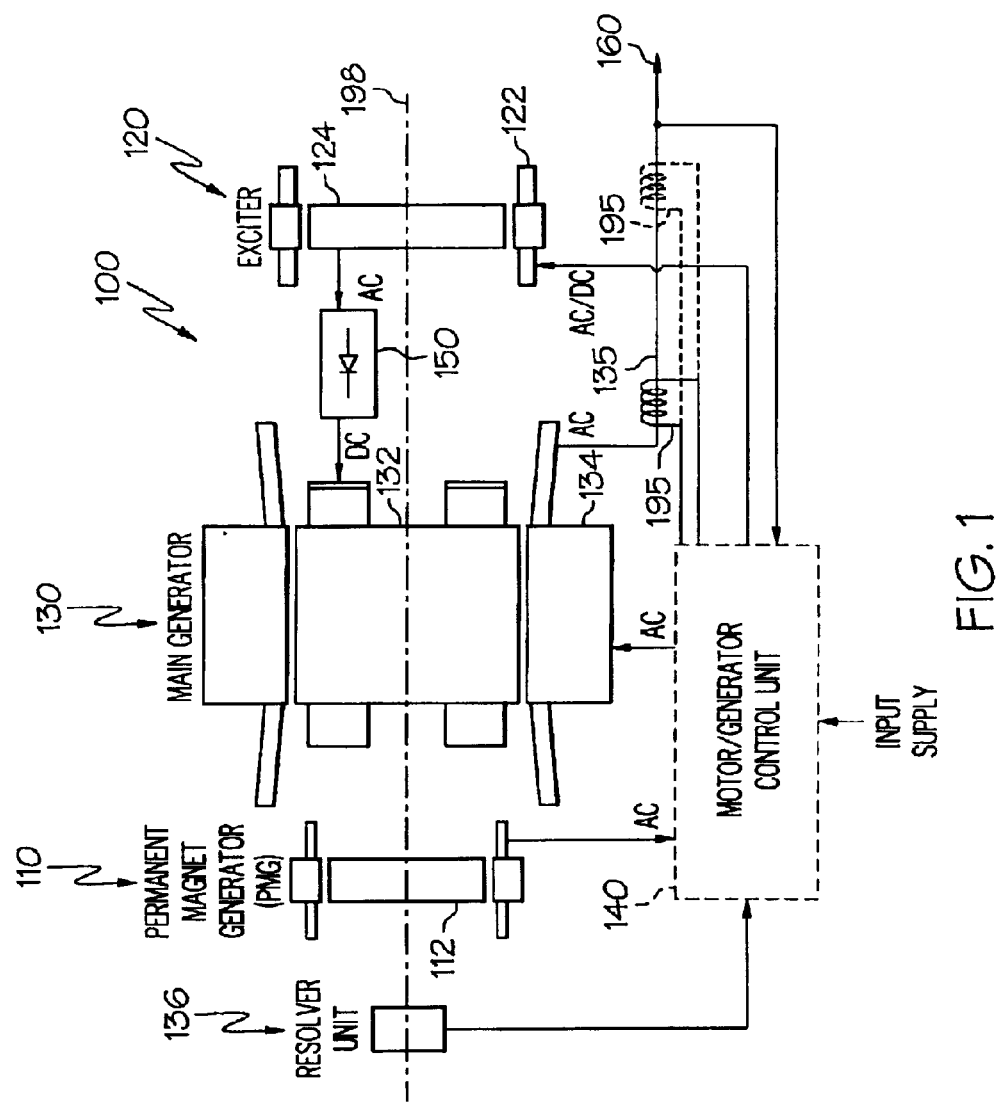
FIG. 1 is a functional schematic block diagram of an exemplary high speed starter-generator system according to an embodiment of the invention.

Turning now to the description, and with reference first to FIG. 1, a functional schematic block diagram of one embodiment of a high speed motor/generator system 100 is shown. This exemplary motor/generator system 100, which is commonly known as a brushless AC motor/generator, includes a permanent magnet generator (PMG) 110, an exciter 120, a main motor/generator 130, a motor/generator control unit 140, and one or more a rectifier assemblies 150. It is noted that the motor/generator system 100 may be used as a starter-generator for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating as a generator, a rotor 112 of the PMG 110, a rotor 124 of the exciter 120, and a rotor 132 of the main motor/generator 130 all rotate. As the PMG rotor 112 rotates, the PMG 110 generates and supplies AC power to the motor/generator control unit 140, which in turn supplies controllable direct current (DC) power to a stator 122 of the exciter 120. The exciter rotor 124 in turn supplies AC power to the rectifier assemblies 150. The output from the rectifier assemblies 150 is DC power and is supplied to the main motor/generator rotor 132, which in turn outputs AC power from a main motor/generator stator 134.

During its operation as a generator, the motor/generator system 100 is capable of supplying output power at a variety of frequencies. Alternatively, a gearing system may be used to operate the motor/generator at a constant speed and, thus, supply a constant frequency. The output power from the main motor/generator stator 134 is typically three-phase AC power. One or more stator output leads 135 supplies the generated AC power to external systems and equipment via one or more terminal assemblies 160, which are discussed in more detail below. The motor/generator control unit 140 can regulate the power output based upon monitoring signals provided to it from monitoring devices 195. In the depicted embodiment, the PMG 110, the exciter 120, and the main motor/generator 130 all rotate along a single axis 198 at the same rotational speed. It will be appreciated, however, that in other embodiments the PMG 110 may rotate along a different axis. Moreover, the relative positioning of the PMG 110, the exciter 120, and the main motor/generator 130 can be modified in different embodiments such that the exciter 120 is physically between the PMG 110 and the main motor/generator 130.

Figure 2:
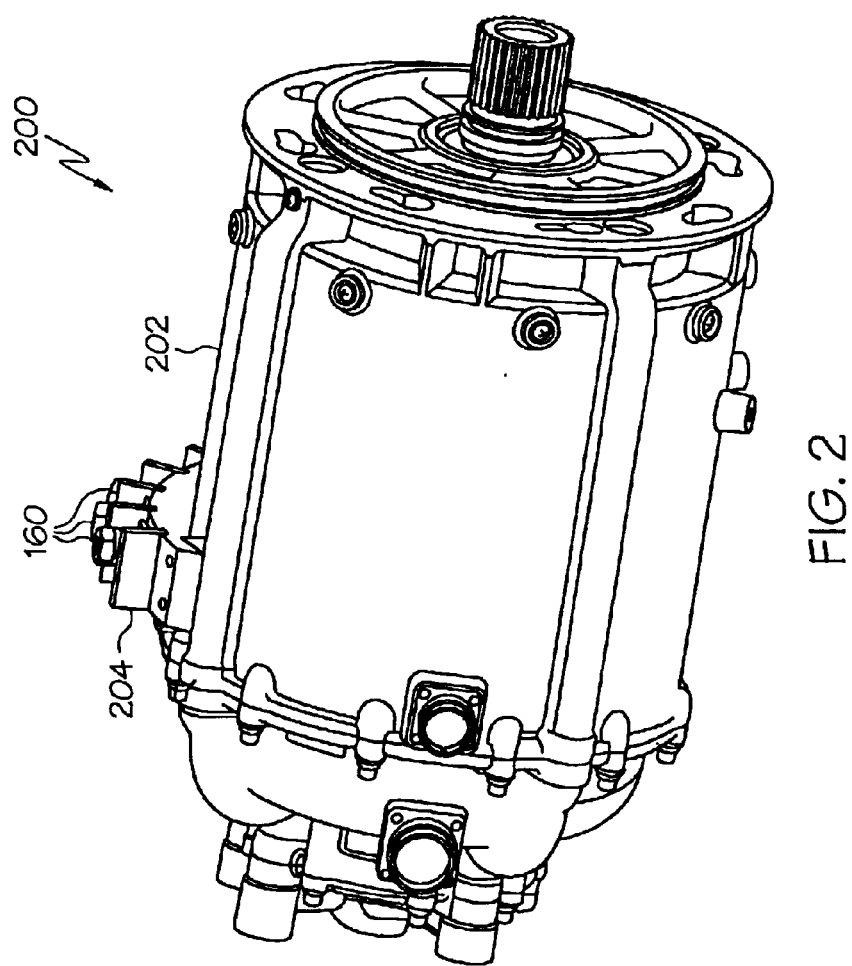
FIG. 2 is a perspective view of a physical embodiment of the starter-generator system depicted in FIG. 1.

When the motor/generator system 100 is operating as a motor, AC power is supplied to the exciter stator 122 and the main motor/generator stator 134 from, for example, an AC power supply section (discussed below) in the motor/generator control unit 140, causing the main motor/generator rotor 132 to rotate. As the main motor/generator rotor 132 rotates, the PMG 110 and exciter 120 also rotate. A position sensing device, such as a resolver unit 136, may also be included in the system 100 to supply a signal representative of the main motor/generator rotor 132 position to the motor/generator control unit 140. This position signal is used to control the AC power supplied to the main motor/generator stator 134 and to the exciter such that the maximum torque is generated. It will be appreciated, however, that the resolver unit 136 need not be included in the motor/generator system 100. Instead, the position signal may be produced using a sensorless method, in which the position is derived from various electrical signals in the motor/generator system 100. A perspective view of an exemplary physical embodiment of at least those portions of the motor/generator system 100 that are mounted within a housing 200 is illustrated in FIG. 2.

Figure 3:
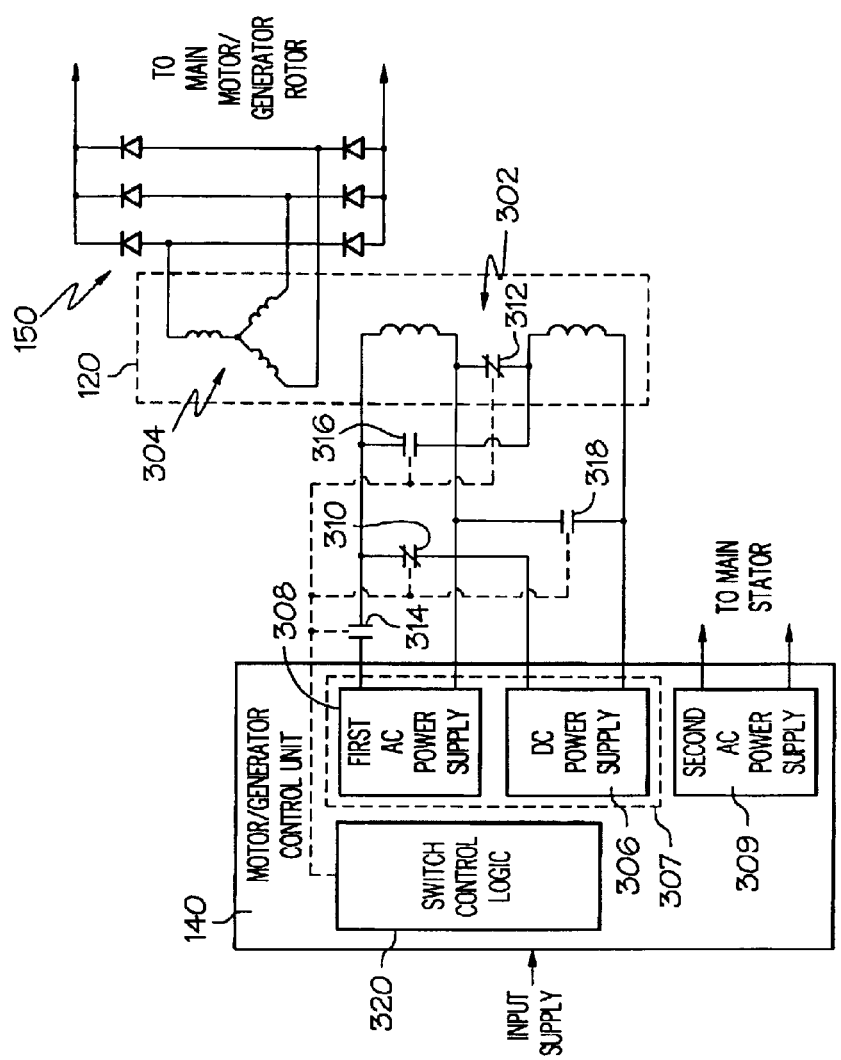
FIG. 3 is a functional schematic block diagram of an exemplary exciter generator stator winding configuration and control circuit that may be used in the starter-generator depicted in FIGS. 1 and 2.

The exciter stator 122 and exciter rotor 124, as shown schematically in FIG. 3, are each made up of a plurality of windings 302 and 304, respectively. As was noted above, during operation as a generator the control unit 140 supplies DC power to the exciter stator windings 302, and during operation as a motor the control unit supplies AC power to the exciter stator windings 302. Thus, the control unit 140 includes a first power supply 307 that is operable to supply either DC power or AC power. In the depicted embodiment, the first power supply 307 includes a DC power supply section 306 and a first AC power supply section 308. It will be appreciated that the DC 306 and AC 308 power supply sections need not be physically separate sections, but could be a single section that is configurable to supply either AC or DC power. When operating as a generator, the first power supply 307 supplies controllable DC power to the exciter stator windings 302. The DC power supplied to the exciter stator windings 302 generates a magnetic field in the exciter stator 122. A prime mover (not illustrated not illustrated in FIG. 3) rotates the exciter rotor 124 and AC power is induced in the exciter rotor windings 304 as the exciter rotor 124 rotates through this magnetic field.

The control unit 140 also includes a second power supply 309 that supplies AC power. When operating as a motor, the first power supply 307 supplies AC power to the exciter stator windings 302, and the second power supply 309 supplies AC power to the main motor/generator stator 134 (not illustrated in FIG. 3). The AC power supplied to the exciter stator windings 302 generates an oscillating magnetic field in the exciter stator windings 302. This oscillating magnetic field induces a voltage in the exciter rotor windings 304, which causes an AC current to flow in the exciter rotor windings 304. This AC current is rectified by the rectifier assemblies 150 and the resultant DC current is supplied to the main motor/generator rotor 132, providing the DC excitation.

The exciter stator windings 302 are wound on the exciter stator 122 and are externally connected, via a plurality of controlled switches 310–318, such that the exciter stator windings 302 are selectively coupled in either series or parallel with one another. In particular, during operation as a generator, switch control logic 320 in the control unit 140 closes switches 310 and 312, and opens switches 314, 316, and 318, which electrically couples the exciter stator windings 302 in series with one another. Conversely, during operation as a motor, the switch control logic 320 opens switches 310 and 312, and closes switches 314, 316, and 318, which electrically couples the stator windings 302 in parallel with one another. By electrically coupling the stator exciter windings 302 in parallel with one another, the overall AC impedance of the exciter stator windings 302 is reduced. Thus, a sufficiently high starting torque may be generated by using an AC power supply section 308 with a lower output voltage magnitude as compared to a starter-generator that maintains the exciter stator windings in series with one another during operation as both a generator and a motor.

Generally, when the motor/generator system 100 is being implemented as an aircraft starter-generator, the aircraft is on the ground and the starter-generator is initially operated as a motor. Thus, switches 310 and 312 are open, and switches 314, 316, and 318 are closed, electrically coupling the exciter stator windings 302 in parallel. In addition, the first AC power supply section 308 is electrically coupled to supply AC power to the exciter stator windings 302. As noted above, this AC power induces a voltage in the exciter rotor 124, which in turn is used to provide the DC excitation to the main motor/generator rotor 132. As was also noted above, the second AC power supply section 309 supplies AC power to the main motor/generator stator 134, which generates a field therein. The flux interaction between the main motor/generator stator 134 and main motor/generator rotor 132 gives rise to rotation. Then, when the rotational speed reaches a predetermined magnitude and is increasing, the motor/generator system 100 switches to operation as a generator. To do so, the switch control logic 320 automatically switches the configuration of switches 310–318, to couple the exciter stator windings 302 in series, and to coupled the DC power supply section 306 to the exciter stator windings 302. In addition, the first 308 and second 309 AC power supply sections are decoupled from the exciter stator windings 302 and the main motor/generator stator 134, respectively. It will be appreciated that the predetermined rotational speed at which operation switches from the motoring mode to the generating mode may vary, depending on the type of engine that is being started.

In the depicted embodiment, the switches 310–318 are each relay-operated contacts. It will be appreciated, however, that the present invention is not limited to this type of switch. It will additionally be appreciated that the present invention is not limited to the circuit arrangement depicted in FIG. 3, in which the exciter stator windings are depicted as being split into 2 equal sections, with 4 terminal connections. Rather, this is merely exemplary of an embodiment that may be implemented with, for example, a 10-pole starter-generator. Other arrangements that may be implemented with a 10-pole starter-generator include splitting the exciter winding into 5 equal sections, with 10 terminal connections. Similarly, with a 12-pole starter-generator, the exciter windings may be split into 2, 3, 4, or 6 equal sections with, 4, 6, 8, and 12 terminal connections, respectively.

The skilled artisan will further appreciate that various other arrangements may be implemented for various other "N-pole" starter-generators. The number of sections and concomitant terminal connections may be selected to meet system design requirements and the desired reduction in AC impedance. Specifically, the AC impedance of the exciter stator windings 302 is reduced by the square of the number of parallel circuits. For example, with 2 parallel circuits the AC impedance is reduced by a factor of 4, with 3 parallel circuits the AC impedance is reduced by a factor of 9, and so on. Moreover, while splitting the exciter stator windings 302 into equal sections is presently preferred, this is merely exemplary of a preferred embodiment, and splitting the windings 302 into non-equal sections may also be done.

The switches 310–318 and exciter stator winding terminal connections may be included when the starter-generator system 100 is initially constructed, or may be installed into an existing starter-generator system 100. To modify an existing system 100, the exciter stator windings 302 are divided into the desired number of sections by selectively opening the winding connections at the desired locations. The appropriate number of terminal wires and switches may then be properly connected into the system, and either new or existing switch control logic 320 may be added to the control unit 140.

The exciter stator winding arrangement and control scheme allows a starter-generator, when operating as a motor, to generate torque that is sufficiently high to start an aircraft engine without adversely impacting the starter-generator's performance in the generating mode. In addition, the present invention does so without significantly impacting the starter-generator's size, weight, and cost, since the AC power supply section included in the starter-generator control unit need not be designed to supply AC power using a relatively high AC voltage magnitude.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine starter-generator, comprising:
a housing;
a shaft rotationally mounted within the housing;
a main rotor mounted on the shaft;
a main stator mounted within the housing and surrounding the main rotor;
an exciter rotor mounted on the shaft;
an exciter stator mounted within the housing and surrounding the exciter rotor, the exciter stator having windings that are electrically divided into a predetermined number of sections; and a control circuit electrically coupled to at least the exciter stator windings and operable (i) to selectively supply AC and DC power thereto and (ii) to selectively couple each of the predetermined number of exciter stator winding sections in one of series and parallel with one another.

2. The starter-generator of claim 1, wherein the control circuit comprises:

a first power supply operable to selectively supply one of AC power and DC power to the exciter stator windings.

3. The starter-generator of claim 2, wherein the first power supply comprises:

a first AC power supply section operable to supply AC power to the exciter stator windings; and a DC power supply section operable to supply DC power to the exciter stator windings.

4. The starter-generator of claim 2, wherein the control circuit further comprises:

a second power supply operable to supply AC power to the main stator.

5. The starter-generator of claim 1, further comprising:

a plurality of first controllable switches electrically coupled between selected ones of the divided exciter stator windings; and a plurality of second controllable switches electrically coupled between the control circuit and selected ones of the divided exciter stator windings.

6. The starter-generator of claim 5, wherein the control circuit includes:

switch control circuitry operable to selectively open and close the selected ones of the plurality of first and second controllable switches, to thereby selectively supply the AC and DC power to the exciter stator windings and to selectively couple the divided exciter stator winding sections in one of series and parallel with one another.

7. The starter-generator of claim 1, wherein the exciter stator windings are divided into an equal predetermined number of sections.

8. A motor/generator, comprising:

a rotationally mounted main rotor;

a main stator surrounding at least a portion of the main rotor;

an exciter including a rotor configured to rotate with the main rotor and a stator having windings that are electrically divided into a predetermined number of sections; and a control circuit electrically coupled to the exciter stator windings and operable (i) to selectively supply AC and DC power thereto and (ii) to selectively couple each of the predetermined number of exciter stator winding sections in one of series and parallel with one another.

9. The motor/generator of claim 8, wherein the control circuit comprises:

a first power supply operable to selectively supply one of AC power and DC power to the exciter stator windings.

10. The motor/generator of claim 8, wherein the first power supply comprises:

a first AC power supply section operable to supply AC power to the exciter stator windings; and a DC power supply section operable to supply DC power to the exciter stator windings.

11. The motor/generator of claim 9, wherein the control circuit further comprises:

a second power supply operable to supply AC power to the main stator.

12. The motor/generator of claim 8, further comprising:

a plurality of first controllable switches electrically coupled between selected ones of the divided exciter stator windings; and a plurality of second controllable switches electrically coupled between the control circuit and selected ones of the divided exciter stator windings.

13. The motor/generator of claim 12, wherein the control circuit comprises:

switch control circuitry operable to selectively open and close the selected ones of the plurality of first and second controllable switches, to thereby selectively supply the AC and DC power to the exciter stator windings and to selectively couple the divided exciter stator winding sections in one of series and parallel with one another.

14. The motor/generator of claim 8, wherein the exciter stator windings are divided into an equal predetermined number of sections.

15. In a gas turbine engine starter-generator including at least an exciter assembly having a stator with windings thereon, a method of modifying the starter-generator, comprising:

dividing the exciter stator windings into a predetermined number of sections, each section having two electrical ends; and electrically coupling a plurality of first controllable switches between selected ones of the predetermined number of exciter stator winding section electrical ends such that:

when a first group of the first controllable switches is closed and a second group of the first controllable switches is open, the predetermined number of exciter stator winding sections are electrically coupled in series with one another, and when the first group of first controllable switches is open and the second group of the first controllable switches is closed, the predetermined number of exciter stator winding sections are electrically coupled in parallel with one another.

16. The method of claim 15, further comprising:

electrically coupling DC power between one of the exciter stator winding section electrical ends and at least one switch selected from the first group of first controllable switches; and electrically coupling AC power between another one of the exciter stator winding section electrical ends and at least one switch selected from the second group of the first controllable switches.

17. The method of claim 15, wherein the exciter stator windings are divided into an equal predetermined number of sections.

18. In an aircraft starter-generator including at least an exciter assembly having a stator with windings thereon that are divided into a predetermined number of sections, a method of operating the starter-generator in a generator mode and a motor mode, comprising:

electrically coupling each of the predetermined number of exciter stator winding sections in parallel with one another and supplying AC power to the parallel-coupled exciter stator windings, to thereby operate the starter-generator in the motor mode; and electrically coupling each of the predetermined number of exciter stator winding sections in series with one another and supplying DC power to the series-coupled exciter stator winding sections, to thereby operate the starter-generator in the generator mode.

19. The method of claim 18, further comprising:

automatically switching the electrical coupling of each of the predetermined number of exciter stator windings from parallel to series when a rotational speed of the exciter reaches a predetermined magnitude.

20. The method of claim 18, further comprising:

automatically switching the electrical coupling of each of the predetermined number of exciter stator windings from parallel to series when a rotational speed of the exciter reaches a predetermined magnitude and is increasing.

* * * * *